(12) United States Patent

Feuerwerger

(10) Patent No.: US 12,625,566 B2

(45) Date of Patent: May 12, 2026

(54) MULTILINGUAL KEYBOARD

(71) Applicant: Isaac Feuerwerger, Brooklyn, NY (US)

(72) Inventor: Isaac Feuerwerger, Brooklyn, NY (US)

( * ) Notice: Subject to any disclaimer, the term of this patent is extended or adjusted under 35 U.S.C. 154(b) by 0 days.

(21) Appl. No.: 19/210,118

(22) Filed: May 16, 2025

(65) Prior Publication Data

US 2026/0086656 A1      Mar. 26, 2026

Related U.S. Application Data

(60) Provisional application No. 63/698,459, filed on Sep. 24, 2024.

(51) Int. Cl.
*G06F 3/02* (2006.01)

(52) U.S. Cl.
CPC .......... *G06F 3/0219* (2013.01); *G06F 3/0227* (2013.01)

(58) Field of Classification Search
CPC .............................. G06F 3/0219; G06F 3/0227
USPC ......................................................... 345/168
See application file for complete search history.

(56) References Cited

U.S. PATENT DOCUMENTS

| | | | | | |
|---|---|---|---|---|---|
| 6,004,049 | A | * | 12/1999 | Knox | G06F 3/0238 |
| | | | | | 400/90 |
| 7,301,532 | B1 | * | 11/2007 | Dobry | G06F 3/0216 |
| | | | | | 345/170 |
| 2009/0308722 | A1 | * | 12/2009 | Hsu | H01H 13/84 |
| | | | | | 200/314 |
| 2017/0351341 | A1 | * | 12/2017 | Norwalk | G06F 3/0202 |
| 2018/0315559 | A1 | * | 11/2018 | Morrison | G06F 1/1637 |
| 2020/0089330 | A1 | * | 3/2020 | Sun | G06F 3/0238 |
| 2021/0247850 | A1 | * | 8/2021 | Norwalk | G06F 3/038 |
| 2022/0367130 | A1 | * | 11/2022 | Chen | H01H 13/20 |
| 2024/0234046 | A1 | * | 7/2024 | Liang | H01H 13/023 |
| 2025/0059366 | A1 | * | 2/2025 | Maat | H01H 13/704 |

* cited by examiner

*Primary Examiner* — Nathan P Brittingham

(57) ABSTRACT

The present disclosure provides a multilingual keyboard comprising a first set of keys with Organic Light-Emitting Diode (OLED) displays and matte-finished key caps, produced through a blending process for clear visibility and aesthetic appeal. The multilingual keyboard includes at least two sets of keys: the first set with OLED displays for dynamic character updates based on the selected language, and a second set with fixed functions for a familiar typing experience. The multilingual keyboard incorporates a language switching system that enables seamless transitions between multiple languages with real-time updates on the OLED displays of the first set of keys. Designed to replace multiple keyboards and complex software mappings, the multilingual keyboard offers a versatile typing solution.

19 Claims, 6 Drawing Sheets

MULTILINGUAL KEYBOARD

CROSS REFERENCE

This non-provisional application claims the benefit under 35 U.S.C. § 119 (e) of U.S. Provisional Patent Application Ser. No. 63/698,459, entitled "AUTOMATED LINGUAL" filed on Sep. 24, 2024.

TECHNICAL FIELD

The present disclosure relates to input devices. More particularly, the present disclosure relates to a multilingual keyboard configured to easily customize display character-istics of one or more keys thereof, based on user preferences.

BACKGROUND

The background description includes information that may be useful in understanding the present invention. It is not an admission that any of the information provided herein is prior art or relevant to the presently claimed invention, or that any publication specifically or implicitly referenced is prior art.

A keyboard (e.g., QWERTY-based or similar keyboard) can be used to input data into a computing device. For instance, a keyboard might be built into a device like a laptop, tablet, or phone. Alternatively, a separate keyboard can be connected to a desktop computer, tablet, or any other device lacking an integrated keyboard. Many keyboards feature backlighting to help users see the keys in dimly lit conditions. However, providing consistent illumination across each key cap can be difficult for various reasons. Moreover, most keyboards include keys that are associated with fixed hard-coded functions, and can only allow a user to provide input data to a computing device in a single language.

Computing devices often need to support multiple lan-guages. For instance, a user might want to type a document in both Hebrew and English, while others might use the computer for emails in various languages such as English, Hindi, Greek, Chinese, Russian, or Arabic. Current multi-lingual keyboards are cumbersome to use, as they typically feature two or three characters on each key, which are often small. This makes it challenging and time-consuming for users to find the correct letter among the numerous charac-ters on the keyboard. Additionally, the small size of the letters can make them hard to read. Given that keyboards are widely used in laptops and keypads are common in many computing devices, improving the ease of data entry across multiple languages would be beneficial and desirable for many applications.

Efforts have been made in the past to develop multilingual keyboards that provide customizable options for users to change an input language for various keys of said multilin-gual keyboard. However, existing multilingual keyboards typically depend on either software-based virtual keyboards or physical keyboards with fixed hard-coded layouts. These techniques require users to memorize key mappings and offer limited adaptability. Moreover, such existing multilin-gual keyboards fail to provide real-time visual feedback for switching languages, which can hinder typing efficiency and overall user experience.

There is, therefore, a demand for a more flexible keyboard that can dynamically support multiple languages and pro-vide immediate visual feedback to users.

SUMMARY

Aspects of the present disclosure relate to a multilingual keyboard multilingual keyboard configured to easily cus-tomize display characteristics of one or more keys thereof, based on user preferences. The multilingual keyboard sup-port multiple languages and provide immediate visual feed-back to users, to improve the overall user experience and typing efficiency.

In one aspect, the multilingual keyboard features a first set of keys, each equipped with at least one Organic Light-Emitting Diode (OLED) display and covered by a key cap. The key cap is made from a material designed to provide a matte finish on its outer surface, enhancing the keyboard's aesthetic appeal. The key cap is produced through a blend-ing/molding process that involves shaping a specific chemi-cal formulation containing Acrylonitrile Butadiene Styrene (ABS) and black carbon to provide a matte black finish to the key cap. This process ensures that both the outer and inner surfaces of the key cap have adequate transparency, allowing the at least one OLED display underneath to be easily visible while preserving the matte finish on the outer surface.

According to an embodiment of the present disclosure, the multilingual keyboard may feature multiple sets of keys. The first set includes keys equipped with OLED displays, while the second set consists of keys with fixed, hard-coded functions. The first set, positioned in the center of the keyboard, includes keys for alphabetical, numerical or spe-cial characters, allowing dynamic display of these characters based on the user's selected language. Meanwhile, the second set adheres to a standard layout to offer a familiar typing experience for users.

According to an embodiment of the present disclosure, the multilingual keyboard may be equipped with a language switching system configured to improve typing efficiency and user experience across a pre-determined set of lan-guages. The language switching system may enable the users to seamless switch between multiple languages with real-time updates of the alphabetical, numerical or special characters depicted on the OLED displays of the first set of keys to reflect the user-selected language's characters. The language switching system is configured to switch one or more of the alphabetical characters, the numerical characters and the special characters to be displayed by the first set of keys, upon receipt of a user input for selecting a desired language among the pre-determined set of languages.

According to an embodiment of the present disclosure, the chemical formulation of the key cap may contain the transparent ABS base doped with the black carbon at a ratio ranging from 25:1 to 35:1 by weight. This formulation of the key cap maintains a matte black appearance of the key cap when the at least one OLED display is off, and allow light from the at least one OLED display to pass through when the OLED display is on.

According to an embodiment of the present disclosure, the multilingual keyboard may include an indication key configured to generate a visual feedback of a current lan-guage being displayed on the at least one OLED display.

According to an embodiment of the present disclosure, the multilingual keyboard may include a set of Light Emit-ting Diode (LED) indicators. Each of the LED indicators may be configured to indicate an operating state of a function key of the keyboard.

According to an embodiment of the present disclosure, the language switching system may include comprises a storage unit configured to store information related to input data and icons associated with the pre-determined languages to be displayed on the at least one OLED display, and an interface unit configured to receive the user input pertaining to selection of the desired language among the pre-determined set of languages. The interface unit may be configured to receive inputs from multiple users, and store information related to the selected language in the storage unit in separate user profiles.

According to an embodiment of the present disclosure, the language switching system may include a control unit operatively connected to the at least one OLED display of each of the first set of keys. The control unit may be remotely configured with the at least one OLED display of each of the first set of keys. The control unit may be configured to dynamically control display of an icon on the at least one OLED display, based on the selection of the desired language among the pre-determined set of languages made by the user through the interface unit.

According to an embodiment of the present disclosure, the control unit may be configured to dynamically switch the icons displayed on the at least one OLED display of each of the first set of keys, when the interface unit 204 receive the user input indicating a change in the desired language.

According to an embodiment of the present disclosure, the multilingual keyboard may include a plurality of rubber pads on a bottom surface thereof to prevent the multilingual keyboard from slipping when placed on a flat or irregular surface.

According to an embodiment of the present disclosure, the multilingual keyboard may include a set of hinges coupled to the bottom surface thereof, each hinge of the set of hinges configured to move between a retracted position and an extended position. In the retracted position, the hinge is substantially flush with the bottom surface. In the extended position, the hinge ensures that the multilingual keyboard is inclined at a predetermined angle relative to a surface on which the multilingual keyboard is placed.

According to an embodiment of the present disclosure, the at least one OLED display may be mounted directly beneath the key cap.

According to an embodiment of the present disclosure, an inner surface of the key cap may include a set of micro-patterns, to enable diffusion and reduce glare of light emitted by the at least one OLED display.

According to an embodiment of the present disclosure, a top surface of the key cap comprises a concave-shaped curved profile.

According to an embodiment of the present disclosure, the at least one OLED display may be positioned between the key cap and an inner frame of the corresponding key of the first set of keys. The inner frame may rest above a rubber dome adapted to provide a consistent tactile feedback when the corresponding key is pressed.

According to an embodiment of the present disclosure, the rubber dome may be made from a silicone-based material.

According to an embodiment of the present disclosure, the inner frame may include one or more light barriers to prevent light bleed between adjacent keys.

According to an embodiment of the present disclosure, the rubber dome may include a conductive pad configured to contact a Printed Circuit Board (PCB) positioned beneath the rubber dome to regulate registration of a key press action for the corresponding key of the first set of keys.

According to an embodiment of the present disclosure, when the key cap of the corresponding key is pressed, the inner frame moves downward to push the conductive pad into contact with the PCB. This completes the electrical circuit between the conductive pad and the PCB, and registers the key press action for the corresponding key.

According to an embodiment of the present disclosure, the multilingual keyboard is designed to eliminate the necessity for multiple keyboards or complex software mappings. It provides a single, versatile solution for multilingual typing. Furthermore, the language switching system supports custom layouts and macros, enhancing its adaptability to various user needs. This system also ensures compatibility with multiple operating systems, including Windows™, macOS™, and Linux™, thereby guaranteeing broad functionality across different computing devices.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

The following is a detailed description of embodiments of the disclosure depicted in the accompanying drawings. The embodiments are in such details as to clearly communicate the disclosure. However, the amount of detail offered is not intended to limit the anticipated variations of embodiments; on the contrary, the intention is to cover all modifications, equivalents, and alternatives falling within the scope of the present disclosures as defined by the appended claims.

Embodiments described herein relate to a multilingual keyboard that integrates advanced features to enhance typing efficiency and user experience across multiple languages. The keyboard (also referred to as "keyboard" hereinafter) includes a set of keys with Organic Light-Emitting Diode (OLED) displays and key caps with a matte finish. The key caps are molded from a material that allows adequate transparency for the OLED displays while maintaining their aesthetic appeal. This setup ensures that the characters displayed on the keys are easily visible. The keyboard features two types of keys, i.e., one set with OLED displays positioned centrally, capable of dynamically updating to show characters based on the user-selected language, and another set with fixed, hard-coded functions arranged in a standard layout for familiar typing. The keyboard is equipped with an integrated language switching system that enables the users to seamlessly switch between languages, with real-time updates of the displayed characters on the OLED keys.

Figure 1A:
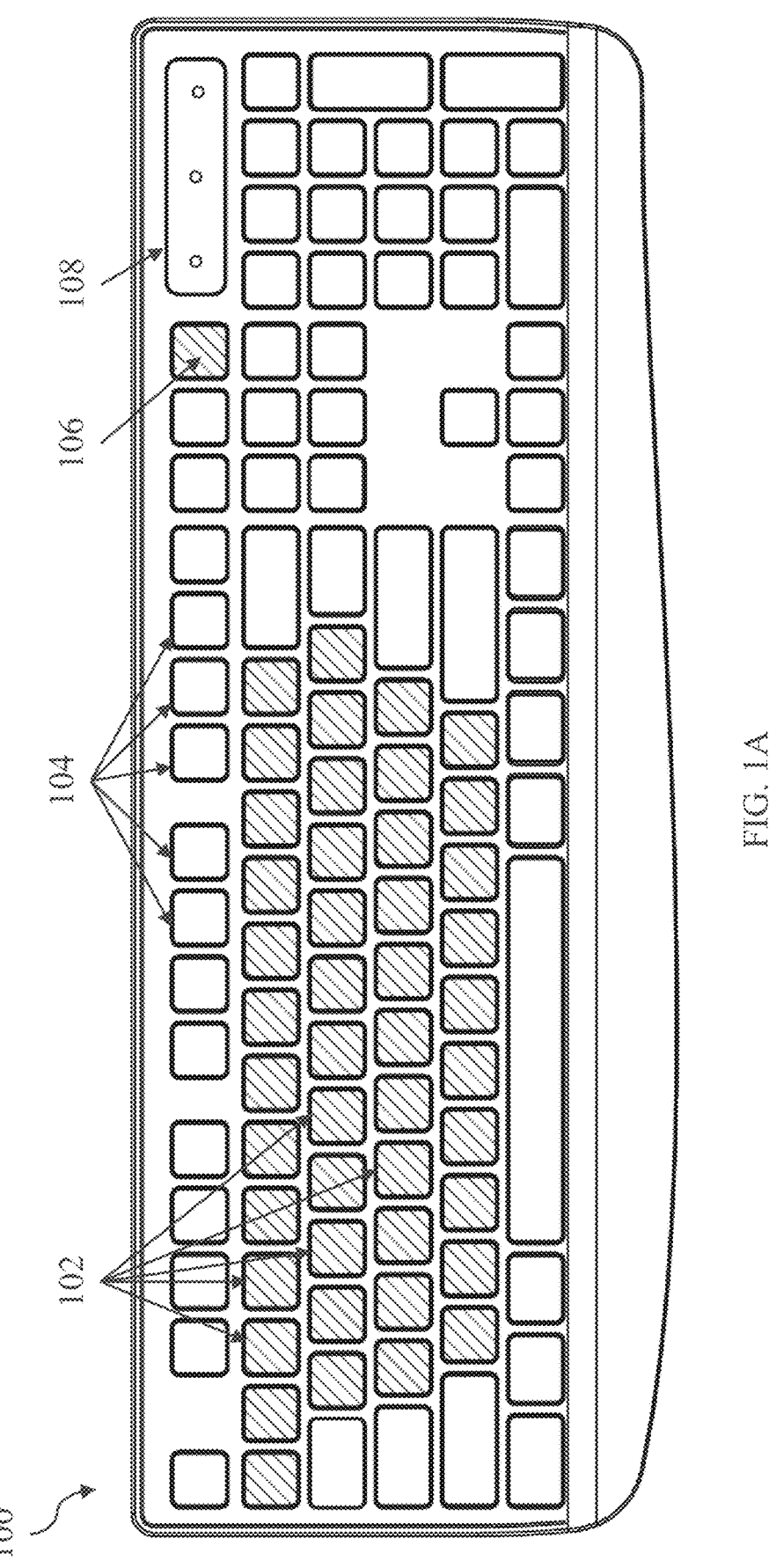
FIGS. 1A to 1C illustrate various exemplary representations of a multilingual keyboard, in accordance with an embodiment of the present disclosure.
Figures 1B, 1C:
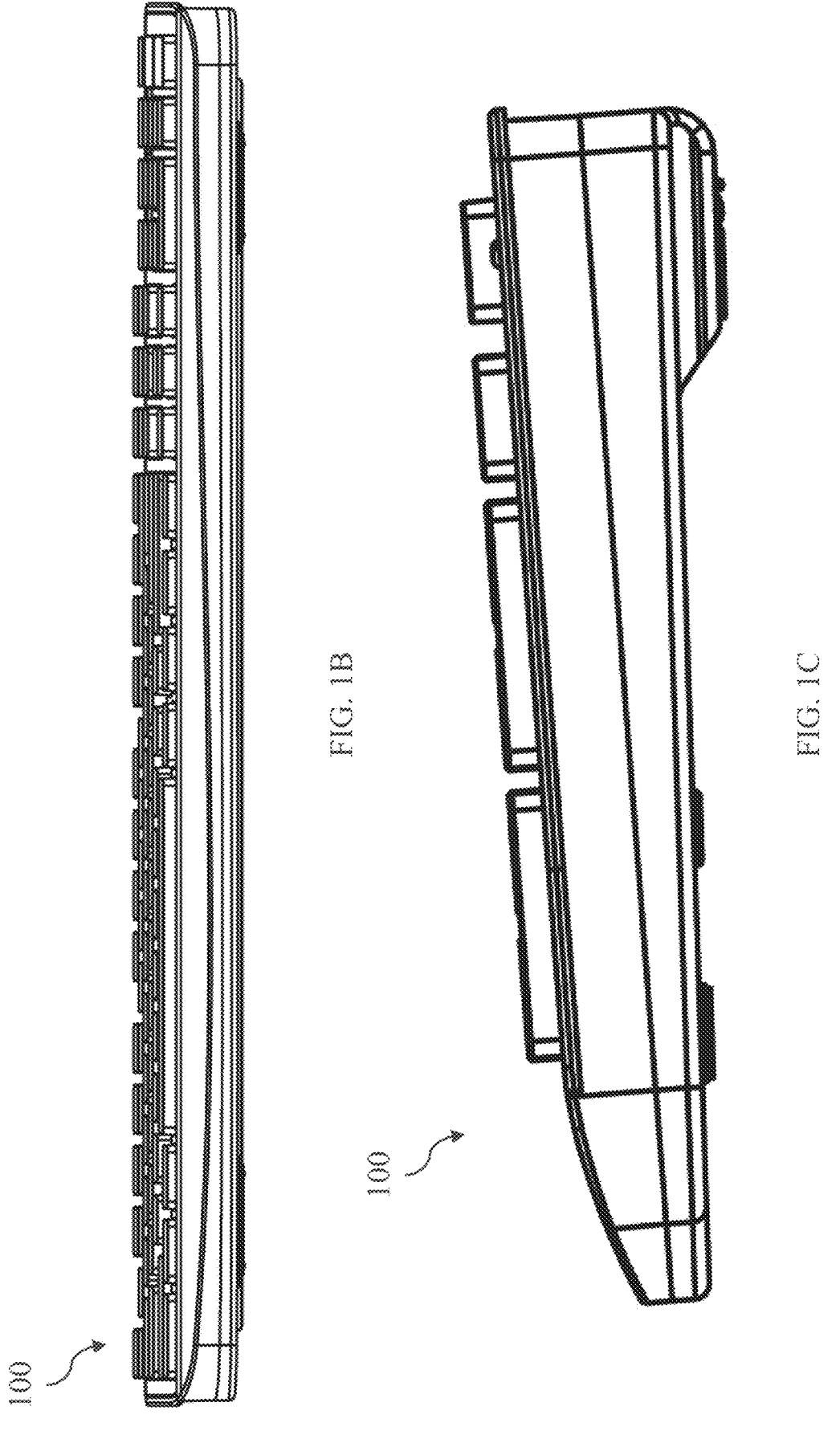

FIG. 1A illustrates a plan view of a multilingual keyboard 100. FIGS. 1B and 1C show a front view and a side view of the multilingual keyboard 100, respectively. The keyboard 100 includes a first set of keys 102, each equipped with at least one high-resolution OLED display and covered by a key cap. The key cap is made from a material designed to provide a matte finish on its outer surface, enhancing the keyboard's aesthetic appeal. The key cap is produced through a blending/molding process that involves shaping a specific chemical formulation containing transparent Acrylonitrile Butadiene Styrene (ABS) base doped with a specific proportion of black carbon. This blending process ensures that both the outer and inner surfaces of the key cap have adequate transparency, allowing the at least one OLED display underneath to be easily visible by a user, while preserving the matte finish on the outer surface.

In an exemplary embodiment, the keyboard 100 may include multiple sets of keys. The first set of keys 102 may include multiple keys equipped with OLED displays, while the second set of keys 104 consists of keys with fixed, hard-coded functions. The first set of keys 102 may be positioned in the center of the keyboard, and includes keys for alphabetical, numerical or special characters, to enable dynamic display of these characters on the OLED displays based on the user's selected language. The second set of keys 104 may be functional keys that adhere to a standard layout to offer a familiar typing experience for users. The first set of keys 102 may be made from durable materials with a tactile feel similar to standard keyboard keys, ensuring a comfortable typing experience.

The keyboard 100 may include an indication key 106 that shows the current language being displayed on the OLED displays of the first set of keys 102. The indication key 106 may have a similar construction as a key among the first set of keys 102, and may include least one OLED display configured to dynamically display any or a combination of alphabetical, numerical or special characters based on the user's selected language. The keyboard 100 may also include a set of Light Emitting Diode (LED) indicators 108, each configured to illuminate to indicate an operating state of a function key of the keyboard 100. For example, one of the LED indicator 108 may be adapted to illuminate when a function key, such as Caps-Lock key of the second set of keys 104, is actuated to cause all letters of bicameral scripts to be generated in capital letters, upon toggle of each of the first and second set of keys 102, 104. Each of the LED indicators 108 may be configured to provide visual feedback about whether a corresponding function key of the keyboard 100 is on or off.

Figure 2:
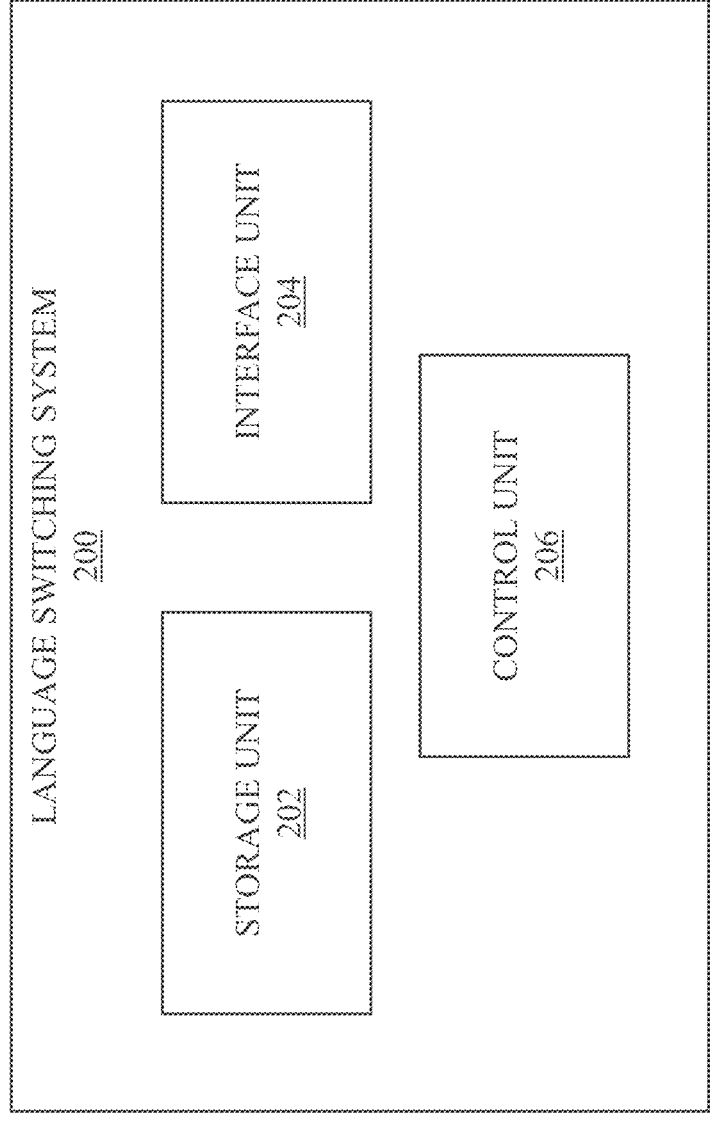
FIG. 2 illustrates an exemplary schematic representation of a language switching system of the multilingual keyboard, in accordance with an embodiment of the present disclosure.

Referring to FIG. 2, the keyboard 100 may incorporate a language switching system 200 for improve typing efficiency and user experience across multiple languages. The language switching system 200 may enable the users to seamless switch between multiple languages with real-time updates of the alphabetical, numerical or special characters depicted on the OLED displays of the first set of keys 102 to reflect the user-selected language's characters. The language switching system (also referred to as "system" hereinafter) 200 may include a storage unit 202 configured to store information related to input data and icons associated with multiple languages. The storage unit 202 may any of a data storage device, a database, and one or more servers that are located in close-proximity, or remotely from each other. The storage unit 202 may be installed within the keyboard 100.

The system 200 may include an interface unit 204 configured to receive input from a user pertaining to selection of a desired language among the languages stored in the storage unit 202. The interface unit 204 may include one or more Input/output (I/O) devices, such as relays, connectors, keyboards, touch panels, wireless transceivers, server/console switches, and the likes, to receive input from the user. The interface unit 204 may be configured to receive inputs from multiple users, and store information related to the selected language in the storage unit 202 in separate user profiles. The interface unit 204 may be configured to wirelessly receive the user input related to the selection of the desired language from the user. The interface unit 204 may also be adapted to wirelessly communicate with a portable device, such as a personal computer, a laptop, a mobile phone, a smart watch, and the like, associated with the user, such as a driver or a passenger of the vehicle, to receive the user input. The interface unit 204 may enable the user to select specific values for the selected language among multiple such values displayed on a display device, for example. In an exemplary embodiment, the storage unit 202 may be configured to log the information pertaining to the language selected by the user through the interface unit 204 each time the user provides an input.

The system 200 may also include a control unit 206 operatively connected to the OLED displays of the first set of keys 102. The control unit 206 may be configured to dynamically control display of an icon on each of the OLED displays, based on the selection of the desired language made by the user using the interface unit 204. In an exemplary embodiment, the control unit 206 may be remotely configured with the at least one OLED display of each of the first set of keys. The control unit 206 may be configured to dynamically switch the icons displayed on the OLED displays of the first set of keys 102, when the interface unit 204 receive a user input indicating a change in the selected language. The control unit 206 may be configured to enable the OLED displays to dynamically change the icons displayed thereon based on the selected language determined by the interface unit 204 according to the user input, to allow real-time dynamic language selection and adaptation.

In an exemplary embodiment, the control unit 206 may be implemented using various hardware configurations or a combination of software and hardware features. For instance, the control unit 206 may incorporate microcontrollers, switches, relays, gates, and specialized hardware features like application-specific integrated circuits (ASICs), electrically erasable programmable read-only memories (EEPROMs), or field-programmable gate arrays (FPGAs). In some cases, memory components like nonvolatile random access memory (RAM) or read-only memory (ROM) may also form part of the control unit 206. In another embodiment, the control unit 206 may be entirely software-based, operating either as part of an operating system or as an application running on one.

Figure 3:
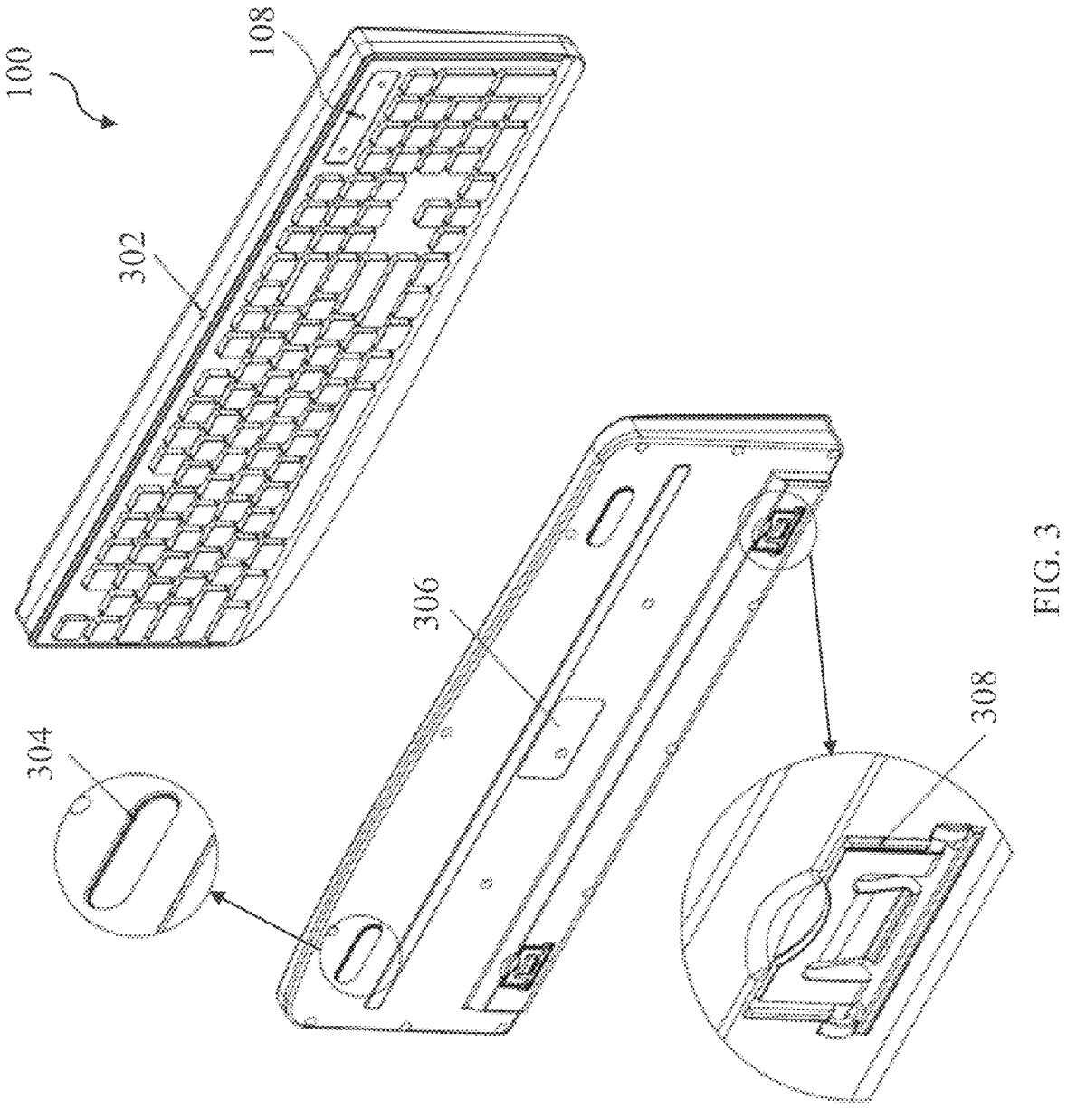
FIG. 3 shows exemplary representations of the multilingual keyboard, in accordance with an embodiment of the present disclosure.

Referring now to FIG. 3, where various exemplary representations of the multilingual keyboard 100 are shown. The keyboard 100 includes a set of Light Emitting Diode (LED) indicators 108, each configured to illuminate and provide a visual indication of whether a corresponding function key of the keyboard 100 is on or off. The keyboard 100 may include a power cable pad 302 adapted to receive a power cable, enabling connection to a connector port, such as an A-type Universal Serial Bus (USB) port, a C-type USB port, or the like, of a computing device, including at least one of a personal computer, a laptop, a portable tablet, a smartphone, or other similar devices. Additionally, or alternatively, the keyboard 100 may be designed to wirelessly connect to the computing device through Bluetooth, Wireless Fidelity (Wi-Fi), or other similar wireless communication technologies. This flexibility allows users to choose from a variety of wireless connection options, providing convenience and enhancing the keyboard's compatibility with different types of computing devices.

The keyboard 100 may be equipped with a plurality of rubber pads 304 on its bottom surface to prevent slipping when placed on a flat or irregular surface. The bottom surface of the keyboard 100 may also include a sticker area 306 adapted to receive a sticker containing information about the specifications of the keyboard 100. The sticker may be removably attached or adhered to the sticker area 306. Furthermore, the bottom surface of the keyboard 100 may include a set of hinges 308, each configured to move between a retracted position and an extended position. In the retracted position, the hinge 308 is substantially flush with the bottom surface of the keyboard 100. When the hinge 308 is moved to the extended position, it ensures that the keyboard 100 is inclined at a predetermined angle relative to the surface on which the keyboard 100 is placed, improving the comfort of the user during use of the keyboard 100.

Figure 4A:
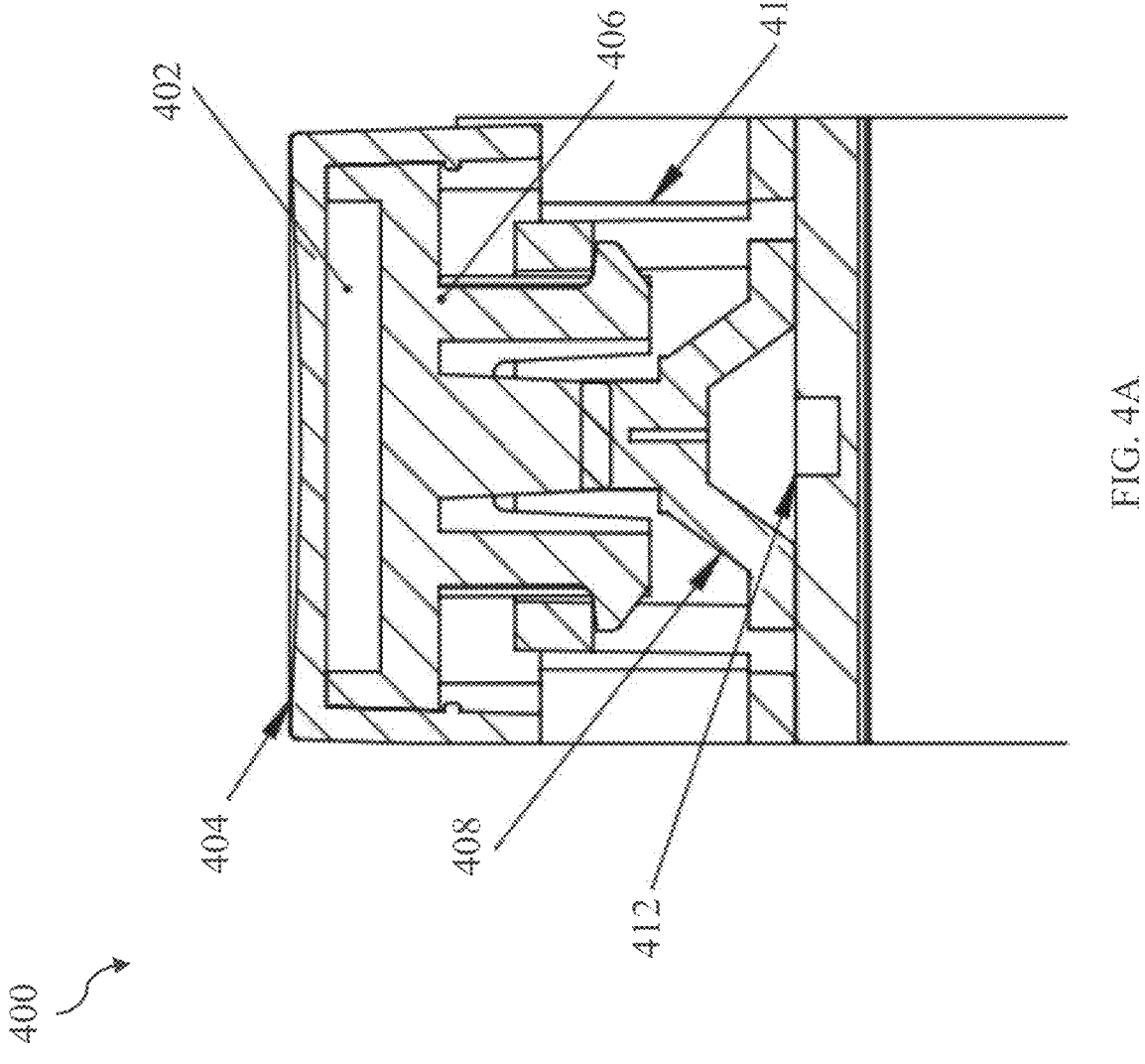
FIGS. 4A and 4B illustrates exemplary sectional views of a key among a first set of keys of the multilingual keyboard, in accordance with an embodiment of the present disclosure.
Figure 4B:
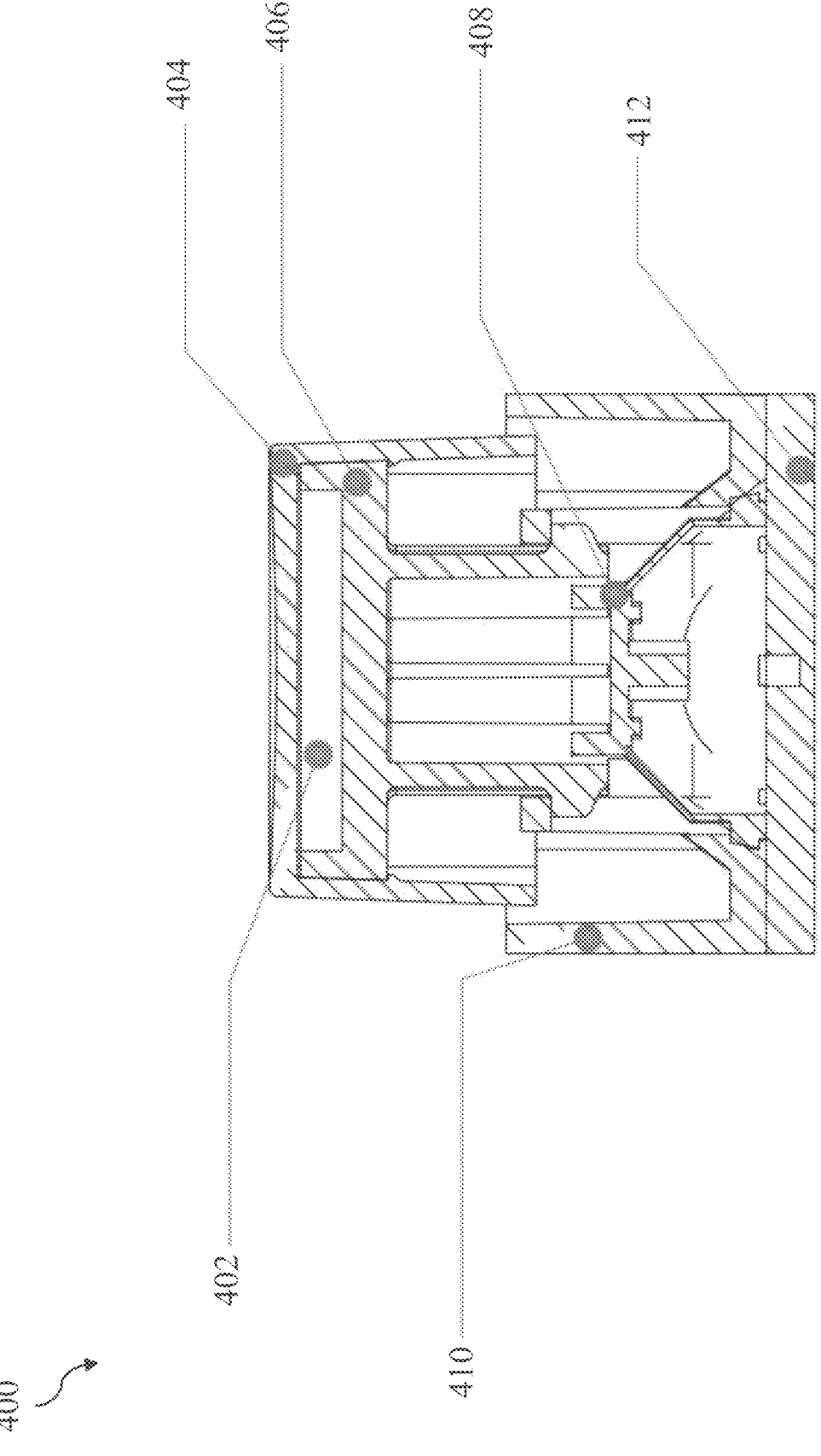

FIGS. 4A and 4B illustrate exemplary sectional views of a key 400 from the first set of keys 102 on the multilingual keyboard 100. The key 400 includes at least one high-resolution OLED display 402, which is covered by a key cap 404. In one exemplary embodiment, the OLED display 402 consists of a 0.42-inch OLED unit mounted directly beneath the key cap 404. The key cap 404 is made from a material specifically designed to provide a matte finish on its outer surface, thereby enhancing the keyboard's aesthetic appeal. The key cap 404 may be designed to ensure even light distribution, making characters and symbols clearly visible. The inner surface of the key cap 404 features precisely engineered micro-patterns, optimized to diffuse the light emitted by the OLED display 402 and prevent glare. This design prevents glare while ensuring uniform light distribution. The top surface of the key cap 404 may have a subtly concave-shaped curved profile, contributing to a more comfortable and better key press experience. The key cap 404 may be produced through a specialized blending process, which involves shaping a specific chemical formulation consisting of a transparent ABS base doped with black carbon in a ratio ranging from 25:1 to 35:1 to achieve a matte black finish. For example, the specific chemical formulation may contain about 1.5 kilograms of the transparent ABS base doped with 0.50 grams of black carbon in a ratio of 30:1 by weight. This specific formulation enables the key cap 404 to maintain a sleek matte black appearance when the OLED display 402 is off, while allowing light from the OLED display to pass through when activated. The black carbon doping ensures appropriate light transmission for the OLED display 402 while maintaining a non-reflective surface, enabling effective visual feedback for the user without compromising the key cap's non-reflective surface. The blending process is carefully designed to uniformly disperse the black carbon particles without affecting transparency of the ABS material, ensuring that both the inner and outer surfaces of the key cap 404 retain adequate transparency. This formulation allows light from the OLED display 402 to easily pass through the keys cap 404 while providing a sleek matte black appearance when the OLED display 402 is off.

This allows the OLED display 402 beneath the key cap 404 to be clearly visible to the user, while preserving the matte finish of the key cap's outer surface. The design of the key cap 404 ensures that light is evenly distributed, making characters and symbols displayed on the OLED display 402 clear and legible. This setup facilitates dynamic character changes on the OLED display 402 without compromising the structural integrity of the key.

The OLED display 402 is positioned between the key cap 404 and an inner frame 406 of the key 400, which rests above a rubber dome 408. The inner frame 406 is designed to move against the rubber dome 408 when the key cap 404 is pressed by the user. The rubber dome 408 is custom-designed to provide consistent tactile feedback with each key press. The rubber dome 408 is made from a silicone-based material, equipped with a conductive pad, and engineered to last for over 10 million key presses, ensuring long-lasting performance.

The rubber dome 408 may be configured to provide tactile feedback through a key travel distance of 4.3 mm. Each key 400 is configured to begin at an initial height of 8.0 mm and compress to approximately 3.6 mm when fully actuated. This compression distance meets the ergonomic and tactile response standards typically associated with mechanical input devices, ensuring a satisfying and responsive typing experience. Additionally, the inner frame 406 of each key 400 may incorporate integrated light barriers, which serve to minimize light bleed between adjacent keys and thereby enhance overall visual clarity and aesthetics of the keyboard 100.

The rubber domes 408 molds used in the multilingual keyboard 100 may be made from silicone-based rubber molds with integrated conductive pads, engineered for durability and performance. These rubber molds may feature precise friction tolerance to ensure consistent tactile feedback over 10 million keypresses, preventing issues like sticking or uneven depressions. The inner geometry of the rubber domes 408 may be adapted to align perfectly with the structure of the key cap 404, minimizing wear from repeated use. Specifically tailored for the multilingual keyboard 100, the rubber dome molds may be optimized to withstand increased actuation demands while maintaining both responsiveness and long-term durability.

The conductive pad of the rubber dome 408 plays a pivotal role in ensuring the proper electrical functionality during keypress interactions. It serves as an intermediary, guaranteeing a reliable electrical connection when the key 400 is pressed. The conductive pad is typically placed in direct contact with an electrical circuit beneath the rubber dome 408, such as a printed circuit board (PCB) 412. When the user presses the key cap 404, the conductive pad makes contact with the underlying PCB 412, completing the electrical circuit and registering the corresponding keypress action. In an exemplary embodiment, when the user presses the key cap 404, the inner frame 406 moves downward, pushing the conductive pad into contact with the PCB 412 or another conductive layer. This action closes the electrical circuit between the conductive pad and the PCB 412, sending a signal to the keyboard's controller or control unit 206, which registers the keypress. The conductive pad facilitates the transmission of electrical signals between the mechanical components of the keyboard 100 and the internal electronics, enabling the keyboard 100 to recognize which key has been pressed and translate it into the appropriate action. For example, pressing a key may result in displaying a corresponding character on a screen connected to the keyboard 100. The conductive pad is typically made from materials such as conductive rubber or silicone, which contain embedded conductive particles. These materials are selected for their durability, ensuring the conductive pad remains effective over extended use, while also providing the responsive tactile feedback that users expect. The high conductivity of the pad ensures that each keypress is accurately detected, which in turn enhances the overall user experience by providing immediate and reliable responses.

The conductive pad is also designed to work in tandem with other tactile mechanisms, such as the rubber dome 408, to offer users the familiar "click" or "bump" sensation during a keypress. This tactile feedback is essential in making the keypress feel responsive and satisfying. The conductive pad ensures that the key 400 responds correctly when pressed, maintaining consistent and reliable feedback for the user. Additionally, the conductive pad helps to prevent issues like "ghosting," where pressing one key might inadvertently register another. By isolating individual keypresses effectively, the conductive pad ensures that pressing one key does not interfere with the detection of others. This is particularly important in applications where multiple keys might be pressed simultaneously. Moreover, the conductive pad contributes to the overall energy efficiency of the keyboard 100. Since the pad completes the electrical circuit with minimal resistance, it helps reduce the energy consumption of the keyboard. This is especially beneficial in battery-powered or wireless keyboards, where conserving battery life is crucial for longer operational periods between charges.

The rubber dome 408 may features precise friction control to avoid issues such as sticking or uneven depressions. Its custom inner geometry aligns perfectly with the key cap 404's structure, ensuring optimal fit and performance. Additionally, the rubber dome 408 is designed to minimize wear and tear caused by repeated key presses, thus enhancing its durability. Specifically tailored for the multilingual keyboard 100, the rubber dome 408 is built to withstand higher actuation demands while maintaining excellent durability and responsiveness. The inner frame 406 is equipped with one or more light barriers to prevent light bleed between adjacent keys. It also includes a set of hooks at the bottom portion, which allow the inner frame 406 to be securely installed with the keyboard's cover 410.

The key 400 is capable of dynamically displaying alphabetical, numerical, or special characters on the OLED display 402, based on the user's selected language. In an exemplary embodiment, the keyboard 400 incorporates the control unit 206 of the language switching system 200. This control unit 206 is operatively connected to the OLED display 402 and is responsible for managing the display of icons. The control unit 206 is configured to dynamically control the display on the OLED screen 402 according to the language selected by the user through the interface unit 204. The control unit 206 is capable of switching the icons displayed on the OLED display 402 when the interface unit 204 receives input indicating a change in the selected language. It allows the OLED display 402 to change the displayed icons in real-time, enabling seamless language adaptation based on user input. This feature provides dynamic language selection and real-time icon updates, ensuring an interactive and adaptable keyboard experience.

In an exemplary embodiment, the keyboard 100 may be designed to eliminate the necessity for multiple keyboards or complex software mappings. The keyboard 100 provides a single, versatile solution for multilingual typing. Furthermore, the language switching system 200 supports custom layouts and macros, enhancing its adaptability to various user needs. The system 200 also ensures compatibility with multiple operating systems, including Windows™, macOS™, and Linux™, thereby guaranteeing broad functionality across different computing devices. The keyboard 100 may be configured to supports wired as well as wireless connections to accommodate different user preferences and device compatibility. The keyboard 100 includes standard indicators (e.g., Caps Lock, Num Lock) and additional indicators for active language mode. The keyboard 100 also supports over-the-air firmware updates, allowing the language switching system 200 to receive software enhancements and additional language support.

The keys 400 of the multilingual keyboard 100 seamlessly integrate aesthetic innovation with advanced functional design. Unlike conventional keys, which are typically static and constructed from opaque materials, the keys 400 are engineered to accommodate dynamic display capabilities through integrated OLED displays. This integration enables real-time changes to key legends, supporting multilingual input and allowing for personalized configurations, all while maintaining the keyboard's structural integrity and visual appeal.

Thus, the multilingual keyboard of the present disclosure is configured to provide real-time visual feedback and adaptable language support, enhancing both typing efficiency and user experience. The keys on the multilingual keyboard blend aesthetic innovation with functional excellence. Unlike standard keys, the first set of keys of the multilingual keyboard are uniquely designed to offer dynamic display adaptability through the integration of OLED displays, allowing for customizable and visually engaging user interactions. In contrast to traditional keyboards, the keyboard of the present disclosure facilitates effortless language switching without the need to memorize key mappings or use multiple keyboards.

Unlike regular keyboard keys made from opaque plastic, the keys of the multilingual keyboard are specially engineered with transparency to support seamless OLED integration, enabling dynamic character changes while maintaining structural integrity. The multilingual keyboard, equipped with the OLED displays and software-based language switching, provides an innovative and effective solution for those who often type in different languages. This distinctive blend of hardware and software overcomes the shortcomings of current technologies, delivering a user experience that stands out due to its adaptability, simplicity, and improved typing efficiency.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

The invention claimed is:

1. A multilingual keyboard, comprising:
   a first set of keys configured to dynamically display one or more of alphabetical characters, numerical characters and special characters based on a selected language by a user;
   a second set of keys with fixed, hard-coded functions; and
   a language switching system configured to switch one or more of the alphabetical characters, the numerical characters and the special characters to be displayed by the first set of keys, upon receipt of a user input for selecting a desired language among a pre-determined set of languages, wherein each of the first set of keys comprises at least one Organic Light Emitting Diode (OLED) display, and a key cap for covering the at least one OLED display, and the key cap is formed of a chemical formulation containing a transparent Acrylonitrile Butadiene Styrene (ABS) base doped with a pre-defined proportion of black carbon; and wherein the chemical formulation of the key cap contains the transparent ABS base doped with the black carbon at a ratio ranging from 25:1 to 35:1 by weight, to maintain a matte black appearance of the key cap when the at least one OLED display is off, and allow light from the at least one OLED display to pass through when the at least one OLED display is on.

2. The multilingual keyboard according to claim 1, further comprising an indication key configured to generate a visual feedback of a current language being displayed on the at least one OLED display.

3. The multilingual keyboard according to claim 1, further comprising a set of Light Emitting Diode (LED) indicators, each LED indicator configured to indicate an operating state of a function key of the keyboard.

4. The multilingual keyboard according to claim 1, wherein the language switching system comprises a storage unit configured to store information related to input data and icons associated with the pre-determined languages to be displayed on the at least one OLED display.

5. The multilingual keyboard according to claim 1, wherein the language switching system comprises an interface unit configured to receive the user input pertaining to selection of the desired language among the pre-determined set of languages.

6. The multilingual keyboard according to claim 5, wherein the interface unit is configured to receive inputs from multiple users, and store information related to the selected language in the storage unit in separate user profiles.

7. The multilingual keyboard according to claim 5, wherein the language switching system comprises a control unit operatively connected to the at least one OLED display of each of the first set of keys, the control unit configured to dynamically control display of an icon on the at least one OLED display, based on the selection of the desired language among the pre-determined set of languages made by the user through the interface unit.

8. The multilingual keyboard according to claim 7, wherein the control unit is configured to dynamically switch the icons displayed on the at least one OLED display of each of the first set of keys, when the interface unit 204 receive the user input indicating a change in the desired language.

9. The multilingual keyboard according to claim 1, further comprising a plurality of rubber pads on a bottom surface thereof to prevent the multilingual keyboard from slipping when placed on a flat or irregular surface.

10. The multilingual keyboard according to claim 1, further comprising a set of hinges coupled to the bottom surface thereof, each hinge of the set of hinges configured to move between a retracted position and an extended position.

11. The multilingual keyboard according to claim 10, wherein in the retracted position, the hinge is substantially flush with the bottom surface, and wherein in the extended position, the hinge ensures that the multilingual keyboard is inclined at a predetermined angle relative to a surface on which the multilingual keyboard is placed.

12. The multilingual keyboard according to claim 1, wherein the at least one OLED display is mounted directly beneath the key cap.

13. The multilingual keyboard according to claim 1, wherein an inner surface of the key cap comprises a set of micro-patterns, to enable diffusion and reduce glare of light emitted by the at least one OLED display.

14. The multilingual keyboard according to claim 1, wherein a top surface of the key cap comprises a concave-shaped curved profile.

15. The multilingual keyboard according to claim 1, wherein the at least one OLED display is positioned between the key cap and an inner frame of the corresponding key of the first set of keys, the inner frame resting above a rubber dome adapted to provide a consistent tactile feedback when the corresponding key is pressed.

16. The multilingual keyboard according to claim 15, wherein the rubber dome is made from a silicone-based material.

17. The multilingual keyboard according to claim 15, wherein the inner frame comprises one or more light barriers to prevent light bleed between adjacent keys.

18. The multilingual keyboard according to claim 15, wherein the rubber dome comprises a conductive pad configured to contact a Printed Circuit Board (PCB) positioned beneath the rubber dome to regulate registration of a key press action for the corresponding key of the first set of keys.

19. The multilingual keyboard according to claim 18, wherein when the key cap of the corresponding key is pressed, the inner frame moves downward to push the conductive pad into contact with the PCB, completing the electrical circuit and registering the key press action for the corresponding key.

* * * * *